United States Patent
Manj et al.

(10) Patent No.: US 11,102,332 B2
(45) Date of Patent: Aug. 24, 2021

(54) METHOD AND SYSTEM FOR RENDERING CONTENT USING TEMPLATES

(71) Applicant: Apple Inc., Cupertino, CA (US)

(72) Inventors: Nurinder Manj, Cupertino, CA (US); Parry Panesar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 16/775,615

(22) Filed: Jan. 29, 2020

(65) Prior Publication Data

US 2020/0244774 A1 Jul. 30, 2020

Related U.S. Application Data

(63) Continuation of application No. 15/923,844, filed on Mar. 16, 2018, now Pat. No. 10,554,784, which is a continuation of application No. 14/865,746, filed on Sep. 25, 2015, now Pat. No. 9,948,749.

(60) Provisional application No. 62/171,799, filed on Jun. 5, 2015.

(51) Int. Cl.
*H04L 29/08* (2006.01)
*H04L 29/06* (2006.01)

(52) U.S. Cl.
CPC .............. *H04L 67/34* (2013.01); *H04L 67/02* (2013.01); *H04L 67/12* (2013.01); *H04L 67/125* (2013.01); *H04L 67/16* (2013.01); *H04L 67/20* (2013.01); *H04L 67/42* (2013.01)

(58) Field of Classification Search
USPC ....................................................... 709/219
See application file for complete search history.

(56) References Cited

U.S. PATENT DOCUMENTS

| | | |
|---|---|---|
| 8,819,698 B2 | 8/2014 | Sandholm et al. |
| 10,671,235 B2 * | 6/2020 | Nychis ................ G06F 11/0766 |
| 2007/0074105 A1 | 3/2007 | McVeigh |
| 2008/0046595 A1 | 2/2008 | Prasad |
| 2010/0235741 A1 | 9/2010 | Newman et al. |
| 2011/0029856 A1 | 2/2011 | Shekar |
| 2011/0099467 A1 | 4/2011 | Kapur |
| 2012/0233235 A1 | 9/2012 | Allaire |
| 2012/0317185 A1 | 12/2012 | Shah |

(Continued)

*Primary Examiner* — Wing F Chan
*Assistant Examiner* — Leon Y Tseng
(74) *Attorney, Agent, or Firm* — Womble Bond Dickinson (US) LLP

(57) ABSTRACT

According to some embodiments, an application launcher of a media player device launches an application bundle, the application bundle including a binary code. In response, a first server is accessed based on a universal resource locator (URL) specified by the application bundle to download an executable script. The executable script is parsed to configure a script runtime environment based on a predetermined template associated with the executable script. A first application programming interface (API) and a second API are enabled, where the first API is used to access a predetermined library maintained by the media player device and the second API is used to communicate with the binary code. The executable script is executed within the script runtime environment to render content, including rendering standard content by invoking the predetermined library via the first API and rendering customized content by invoking the binary code via the second API.

20 Claims, 12 Drawing Sheets

(56) References Cited

U.S. PATENT DOCUMENTS

2013/0074131 A1     3/2013   Cerveau et al.
2013/0145357 A1     6/2013   Korycki
2014/0068421 A1     3/2014   Bourke

* cited by examiner

```
//----------------------------------
// Custom tags.
//----------------------------------
Register_Custom_Tag (custom_lockup_button);    ⎬ 601

//----------------------------------
// Custom view creation blocks for custom tags.
//----------------------------------
Create_Custom_View (custom_view);              ⎬ 602
Set_Custome_View_Attributes (colot, text, size);

//----------------------------------------------------------------
// Custom JS APIs registered here. This delegate API is invoked before evaluating
// application.js into the JSContext.
//----------------------------------------------------------------
Call_Native_Code ();                           ⎬ 603
};
```

FIG. 6

```
Call_Native_Code_Log_Events ("App Launch");

DownLoad_Script (URL/URI);

Parse_Script ();

Call_Native_Code_Log_Events ("Evaluate Success");

Load_Script ();

Call_Native_Code_Log_Events ("Load Success");
```

FIG. 7

```
<stack>
    <title>Content Title</title>
    <row>                            ⎫
        Layout Settings              ⎬ 801
    </row>                           ⎭
    <description>                    ⎫
        Content Description          ⎬ 802
    </description>                   ⎭
    <row>
        <preview_button>             ⎫
            Preview button description
        </preview_button>            ⎬ 803
        <buy_button>
            But button description
        </buy_button>                ⎭
        <ccButtonLockup>             ⎫
            ccButton description     ⎬ 804
        </ccButtonLockup> -->        ⎭
    </row>
</stack>
```

FIG. 8

METHOD AND SYSTEM FOR RENDERING CONTENT USING TEMPLATES

RELATED APPLICATIONS

This application is a continuation of U.S. application Ser. No. 15/923,844 filed Mar. 16, 2018, which is a continuation of U.S. application Ser. No. 14/865,746 filed Sep. 25, 2015, now issued as U.S. Pat. No. 9,948,749, which claims the benefit of U.S. Provisional Patent Application No. 62/171,799, filed Jun. 5, 2015, which is incorporated by reference herein in its entirety.

FIELD OF THE INVENTION

Embodiments of the present invention relate generally to data processing systems. More particularly, embodiments of the invention relate to rendering content using templates.

BACKGROUND

Streaming of content generally refers to multimedia content that is constantly transmitted from a server device and received by a client device. The content is usually presented to an end-user while it is being delivered by the streaming server. The name refers to the delivery method of the medium rather than to the medium itself.

Current streaming services generally require specialized servers to distribute "live" content to set-top boxes of end users. Special software running with a set-top box (e.g., Apple TV™ box) is configured to play the media content (e.g., movie, a television or TV program) that is streamed from a content provider server (e.g., Netflix® or Hulu®). Similar to a mobile application, such special software may be an application that is developed by a software developer associated with the content provider and distributed by another server associated with a device provider of the set-top box (e.g., iTunes™ from Apple Inc.®).

Before the software of a content provider can be distributed, the software must be inspected and approved by the device provider. Once the software has been approved, it is not convenient to change or customize the software's functionalities, which is inconvenient in some circumstances.

BRIEF DESCRIPTION OF THE DRAWINGS

Embodiments of the invention are illustrated by way of example and not limitation in the figures of the accompanying drawings in which like references indicate similar elements.

FIG. 6 is pseudo code representing of a client application according to one embodiment of the invention.

FIG. 7 is pseudo code illustrating an example of JavaScript according to one embodiment of the invention.

FIG. 8 is pseudo code presenting a template-based application according to one embodiment of the invention.

DETAILED DESCRIPTION

Figure 1:
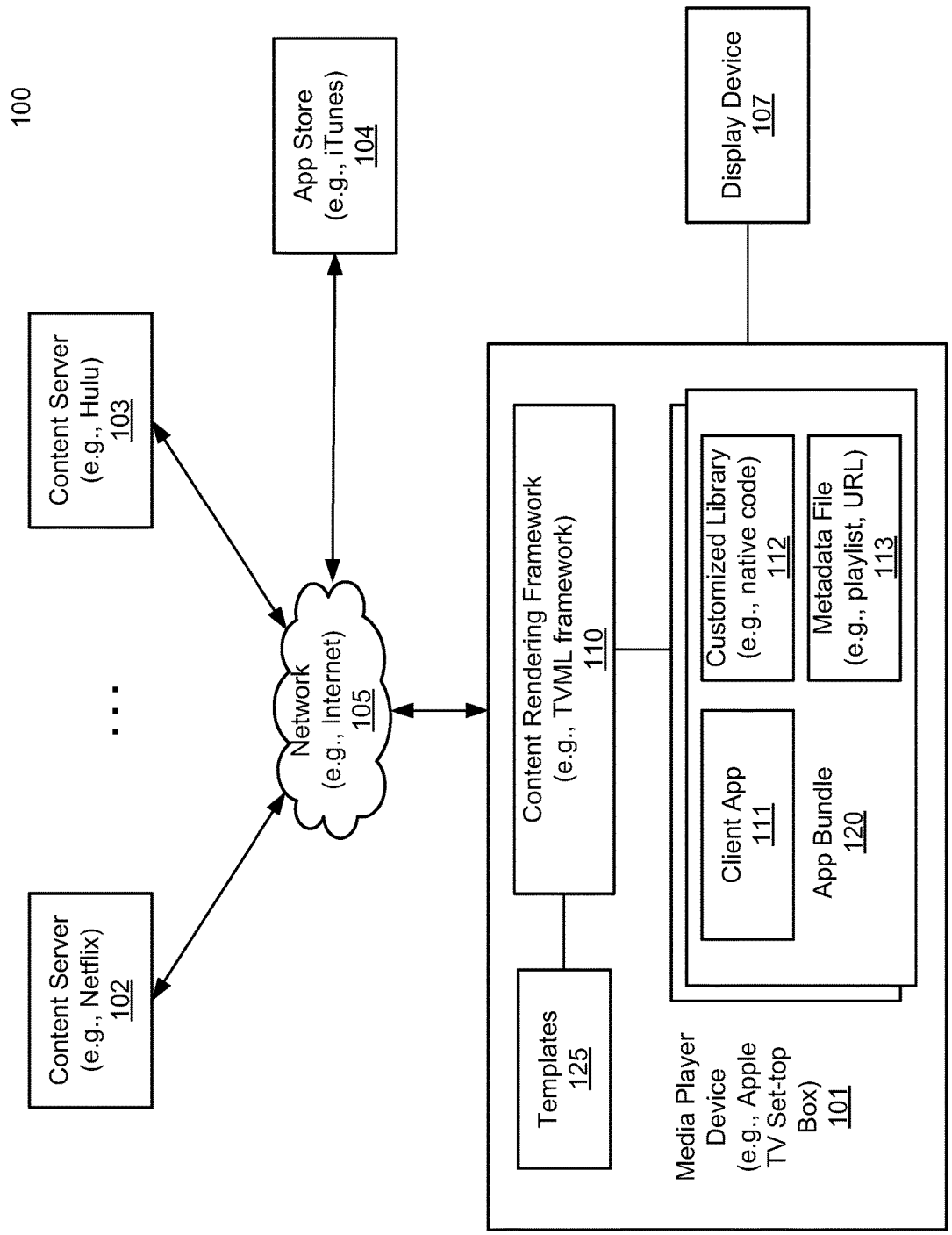
FIG. 1 is a block diagram illustrating a system for rendering content based on template-based applications according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, content (e.g., media content such as movies, songs, video games, or graphical user interface or GUI) provided by a content provider (e.g., Netflix, Hulu) can be specified and configured based on a predetermined set of one or more templates. The templates may be provided by a device provider of a media player device or content distributor (e.g., Apple TV™ set-top box, iPod™, iPhone™, and iPad™ provided by Apple Inc.) that provide a standardized specification to allow many content providers to develop or provide content to users of media player devices in a unified manner. In one embodiment, a template includes standard tags or sections that specify how standard content (e.g., a view of graphical user interface or GUI) is rendered by a media player device. The template also includes one or more customized tags or sections to allow a developer of a content provider to customize customized or special content.

A media player device or appliance can render standard content based on the standard tags of a client application that is provided by a content provider based on a predetermined template (also referred to as a template-based application), using a set of standard libraries maintained by the media player device and provided by the corresponding device provider or content distributor. In addition, the media player device can parse, configure, and render customized content based on the customized tags of the client application, using a customized library that is provided by the content provider via a customized application programming interface (API). The customized library may be developed using native code, such as, for example, in a binary code format. The client application may be distributed by the device provider or content distributor and downloaded from a distribution server (e.g., iTunes™). As a result, a content provider has the flexibility to customize its content to be presented to a user, without complicated management and/or configuration processes involved from the device provider or content distributor.

According to one embodiment, an application launcher of a media player device launches an application bundle that is downloaded from an application distribution server such as an app store (e.g., iTunes) over a network. The application bundle includes a client application and a customized binary code or library. In response to launching the application bundle, the media player device accesses a content server of a content provider based on a universal resource locator (URL) or universal resource indicator (URI) specified by the application bundle to download a template-based application, such as an executable script (e.g., JavaScript and/or extensible markup language or XML files). The media player device parses the template-based application to configure or set up a runtime environment of the template-based application (e.g., Java runtime environment) based on a specification of a corresponding template, including defining or declaring, enabling or activating (e.g., exposing or making it available) a customized API that can used to invoke the customized binary code or library in a runtime or execution environment.

The media player device then executes the template-based application in the configured runtime environment to render content to be presented to the user of the media player device. In one embodiment, the media player device renders standard content based on information obtained from the standard tags of the template-based application. The media player device also renders customized content based on information obtained from the customized tags of the template-based application. The media player device further invokes the customized binary code or library via the customized API to render customized content.

According to another aspect of the invention, a distribution server (e.g., iTunes) maintains and stores application bundles therein from various content providers (e.g., Netflix, Hulu), where at least some of the application bundles include a binary library that may be developed using native code or a native programming language. A request is received initiated from a media player device over a network, where the request includes an application bundle identifier (ID) identifying a first of the application bundles. In response to the request, the first application bundle is identified and transmitted to the media player device over the network. The application bundle, which when launched within the media player device, causes the media player device to access a content server of a corresponding content provider to download a template-based application.

The media player device parses the template-based application to configure or set up a runtime environment within the media player based on a predetermined template, including enabling or activating (e.g., exposing or making it available) a set of standard APIs and customized APIs in a runtime or execution environment. The media player device then executes the template-based application in the configured runtime environment to render content, including rendering standard content based on the standard tags, rendering customized content based on the customized tags of the template-based application, and invoking the customized binary code or library via the customized API to render customized content. For the purpose of illustration throughout this application, a JavaScript and/or XML is utilized as an example of a template-based application. However, the techniques described herein can be applied to other executable scripts or programming languages.

FIG. 1 is a block diagram illustrating a system for rendering content based on template-based applications according to one embodiment of the invention. Referring to FIG. 1, system 100 includes media player device 101 communicatively coupled to content servers 102-103 and app store server 104 over network 105. Content servers 102-103 may be associated with a variety of content providers, such as Netflix and Hulu, etc., which provide content (e.g., movies, songs, images) to be streamed over network 105 and rendered and played at media player device 101. Media player device 101 can be a variety of electronic devices, appliance devices, or data processing systems that are capable of accessing network 105. For example, media player device 101 may be a desktop (e.g., iMac™), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box (e.g., Apple TV™ box), or a combination thereof. Network 105 may be a variety of networks, such as local area network (LAN), wide area network (LAN), or a combination thereof.

In one embodiment, media player device 101 includes content rendering framework 110 to process application bundles such as bundle 120 to process based on templates 125 and render content to be presented at media player device 101, for example, displaying the content at display device 107, internally or locally, via an interconnect (e.g., a high definition multimedia interface or HDMI cable), or via a wireless connection. Application bundle 120 may be downloaded from server 104 as part of application distribution by an app store associated with a device provider or a content distributor (e.g., Apple Inc.) that provides media player device 101. Application bundle 120 may be provided by content providers associated with content servers 102-103 and approved and distributed by app store 104 over network 105. App store 104 may be associated with a content distributer and/or a device provider that provides media player device 101. Application bundle, which when launched in a memory and executed by a processor of media player device 101, configures an operating environment to stream content (e.g., video clips or movies, audio clips or songs, video games, photos) from a corresponding content server (e.g., servers 102-104) to be presented at a media user interface (e.g., display, audio jack, or both, not shown) of media player device 101.

According to one embodiment, application bundle 120 includes at least one client application or main application 111, one or more customized libraries 112, and one or more metadata files 113. Client application 111 may be developed in a variety of programming language, such as, for example, an executable script (e.g., JavaScript or XML). Customized library 112 may be developed using native code (e.g., C/C++). Metadata file 113 may include an URL as well as other metadata such as a playlist. In one embodiment, when application bundle 120 is launched, content rendering framework 110 determines an URL from metadata 113 to access a content server of a content provider associated with application bundle 120. In this example, content rendering framework 110 access content server 102 to download a JavaScript as well as the associated XML data, which are collectively referred to as a template-based application. Again, for the purpose of illustration, JavaScript is utilized as an example of an executable script representing a template-based application. Other types of programming languages, scripts, or formats may also be utilized.

Once the JavaScript and/or the associated XML have been downloaded, content rendering framework 110 parses the JavaScript and/or XML based on one or more of templates 125 to set up or configure an operating environment (e.g., a script runtime environment), in this example, a Java runtime environment. A script context or Java context is created based on the JavaScript and/or XML file. The content rendering framework 110 also enables or activates (e.g., exposing or making it available) a set of standard APIs and a set of customized APIs in a runtime or execution environment. In one embodiment, the XML file has been created based on the element definitions of a corresponding template. The XML file is parsed and converted into a document object model (DOM) compatible document.

The content rendering framework 110 then renders, for example, by executing the DOM document in the Java runtime environment, the standard content defined by standard tags of the templates and customized content defined by customized tags of the downloaded JavaScript, including invoking a process or function provided by customized library 112. The content rendered by content rendering framework 110 is then presented to a user of media player device 101. The term "content" refers to any visible and/or audible data or signals, which can be media content (e.g., movies, songs, photos, video games) or graphical representations (e.g., GUI items such as icons, buttons, menu items, lists of items, windows, dialog boxes), etc.

DOM is an API for valid HTML (hypertext markup language) and well-formed XML documents. It defines the logical structure of documents and the way a document is accessed and manipulated. In the DOM specification, the term "document" is used in the broad sense—increasingly, XML is being used as a way of representing many different kinds of information that may be stored in diverse systems, and much of this would traditionally be seen as data rather than as documents. Nevertheless, XML presents this data as documents, and the DOM may be used to manage this data. With DOM, programmers can build documents, navigate their structure, and add, modify, or delete elements and content. Anything found in an HTML or XML document can be accessed, changed, deleted, or added using DOM.

In one embodiment, templates 125 can include a variety of templates for a variety of purposes or functionalities. For example, templates 125 include, amongst others, a form template (to present a form in a particular manner), a list template (to present a list of items in a particular way), a menu bar template (to present a menu bar), a photo album template (to present a photo album configuration), a product template (to present a product), etc. When a template-based application (e.g., JavaScript) is received, content rendering framework 110 identifies a corresponding template from templates 125 and renders content elements of the template-based application based on the element definitions defined by the corresponding template. For example, the elements or tags of the template-based application may define a button, a size of the button, a color or shape of the button, and a display location of the button, etc. Based on the attributes specified in the template-based application, content rendering framework 110 can render a button with the proper size, shape, and color, and display the button at a proper location of a display device.

Figure 2:
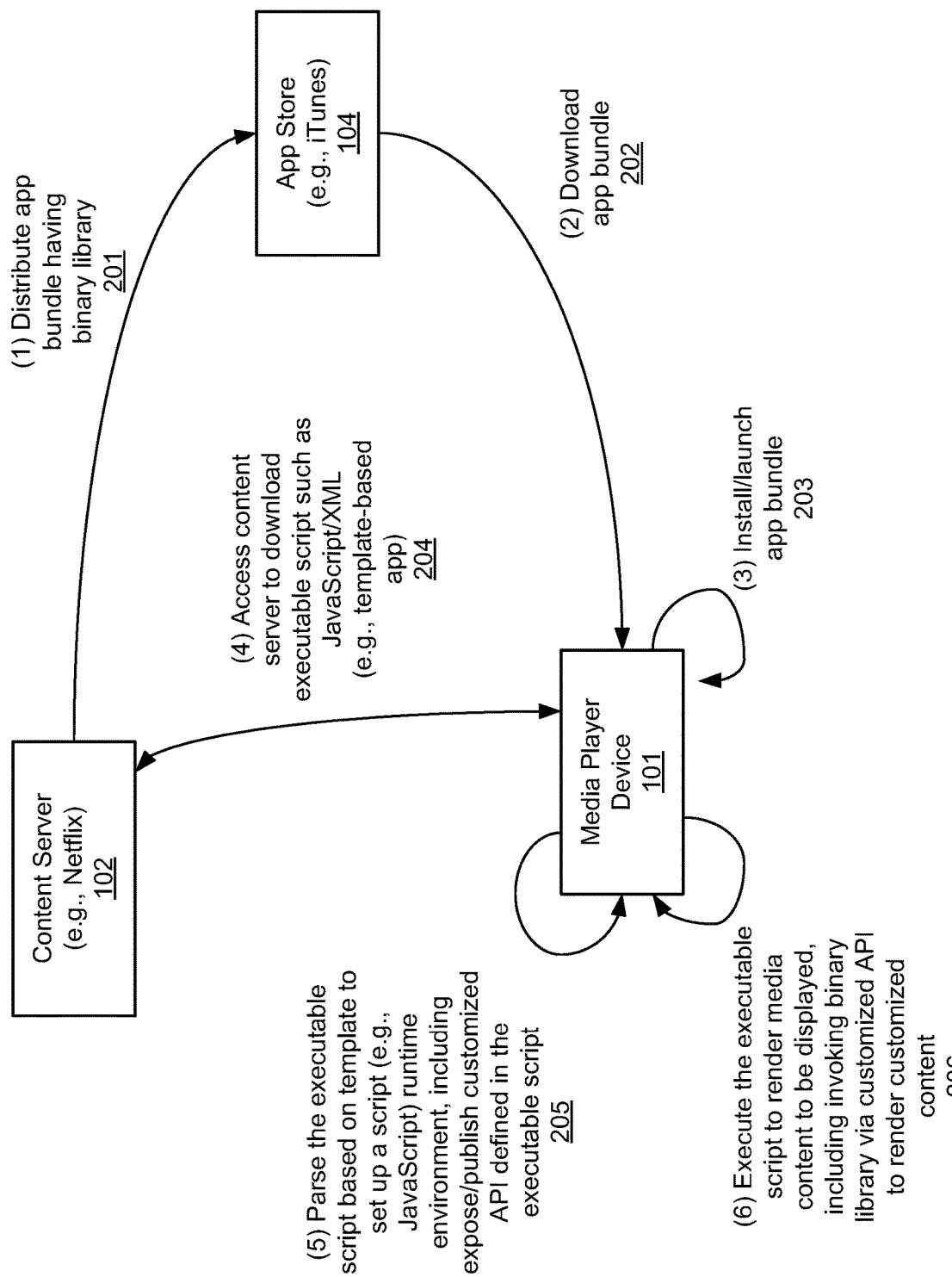
FIG. 2 is a transactional diagram illustrating interactions amongst servers and a media player device according to one embodiment of the invention.

FIG. 2 is a transactional diagram illustrating interactions amongst servers and a media player device according to one embodiment of the invention. Referring to FIG. 2, initially content provider distributes an application bundle to content distributor 104 via transaction 201. Subsequently a user of media player device 101 downloads the application bundle from content distributor 104 via transaction 202. The application bundle is then installed and launched with media player device 101 via transaction 203. In response, media player device 101 accesses content server 102 to download a template-based application, in this example, a JavaScript and/or XML, via transaction 204. Media player device 101 parses the JavaScript and/or XML based on a corresponding template via transaction 205 to configure a Java runtime environment, including enabling or activating (e.g., exposing or making it available) a set of standard APIs and customized APIs in a runtime or execution environment. The JavaScript and/or XML are then executed in the Java runtime environment to render content for the content provider via transaction 206, including invoking a customized library via the customized APIs to render customized content.

Figure 3:
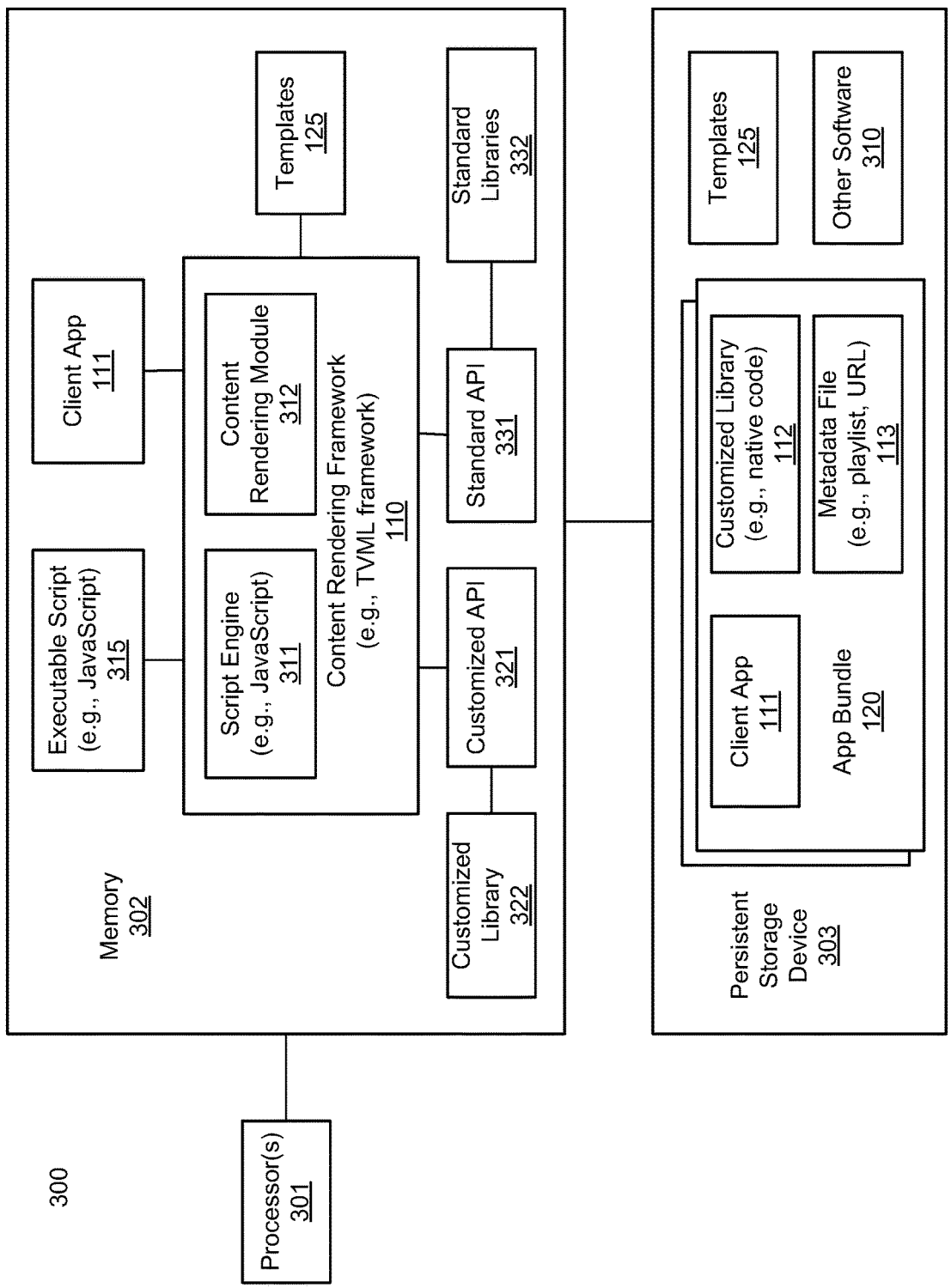
FIG. 3 is a block diagram illustrating a media player device according to one embodiment of the invention.

FIG. 3 is a block diagram illustrating a media player device according to one embodiment of the invention. Device 300 may represent media player device 101 of FIG. 1. Referring to FIG. 3, device 300 includes, but is not limited to, one or more processors 301, memory 302, and persistent storage device 303 (e.g., hard disks, flash memory devices, or other non-volatile storage devices). Storage device 303 stores application bundles such as application bundle 120 downloaded from a content distribution server (e.g., iTunes) such as server 104 of FIG. 1, templates 125, and other software 310 (e.g., operating system, content rendering software).

In one embodiment, content rendering framework 110 is loaded from persistent storage device 303 as part of software 310 into memory 302 and executed by processor(s) 301. Content rendering framework 110 may be a part of a TVML framework. When application bundle 120 is launched into memory 302, client application 111 and/or customized library 112 are loaded in memory 302. In addition, content rendering framework 110 examines metadata file 113 to determine certain attributes or configurations of application bundle 120. In one embodiment, content rendering framework 110 determines an URL from metadata 113 and accesses a content server (e.g., content servers 102-103 of FIG. 1) based on the URL to download a JavaScript and/or XML 315 as part of a template-based application.

Figure 4:
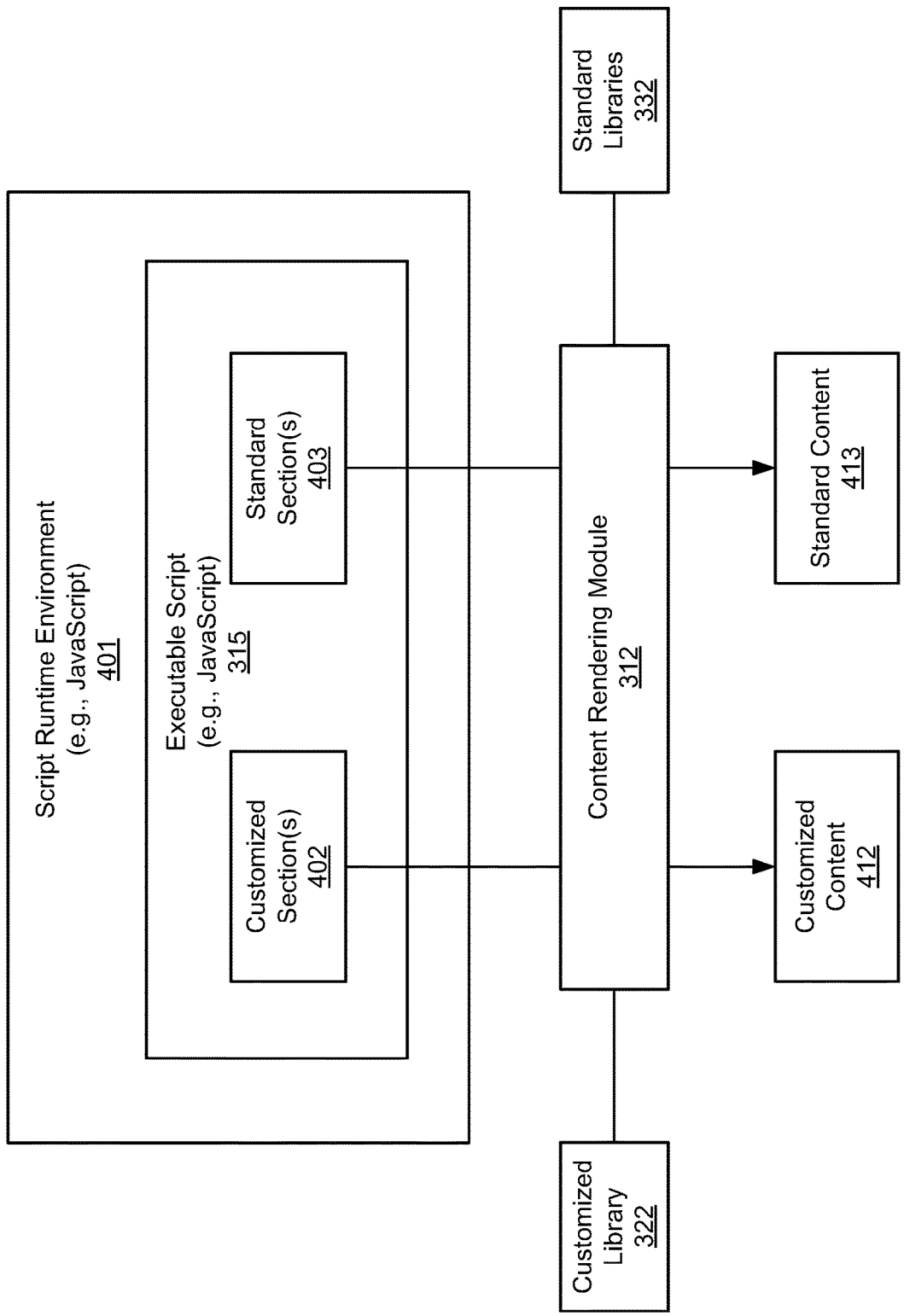
FIG. 4 is a block diagram illustrating a media player device according to another embodiment of the invention.

JavaScript engine or parser 311 (also referred to as a template processing unit or a script execution engine) parses JavaScript 315 and/or XML based on element definitions of a corresponding one of templates 125 to configure or set up a Java runtime environment (e.g., template-based operating environment or script runtime environment) 401 as shown in FIG. 4, including defining or declaring a set of customized APIs 321 and standard APIs 331 as described above. Referring to FIGS. 3-4, JavaScript engine (also simply referred to a Java engine or Java core) 311 executes JavaScript 315 and/or client application 111 in the Java runtime environment 401. Content rendering module 312 renders standard content 413 based on standard tags or standard sections 403 of JavaScript 315 and renders customized content 412 based on customized tags or sections 402 of JavaScript 315. JavaScript 315 and/or client application 111 may invoke standard libraries 332 via standard API 331 and invoke customized library 322 via customized API 321 during the execution to perform any standard operations or customized operations.

Figure 5A:
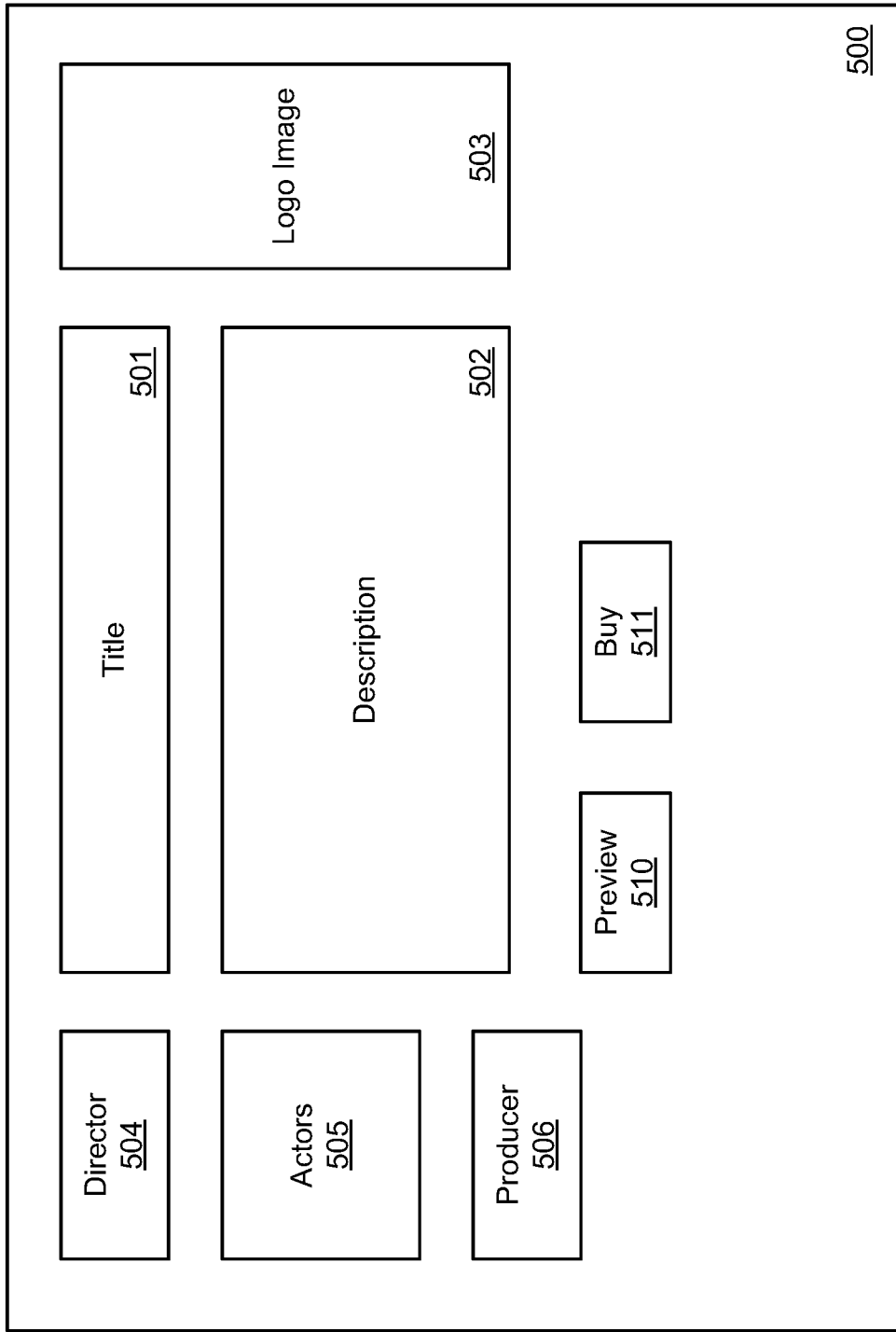
FIGS. 5A-5B are block diagrams illustrating an example of a graphical user interface rendered according to certain embodiments of the invention.

FIG. 5A is a block diagram illustrating an example of a graphical user interface rendered according to one embodiment of the invention. Referring to FIG. 5A, GUI 500 may be rendered and generated by content rendering framework 110 as described above. GUI 500 in this example is rendered as part of standard content based on a template-based application. GUI 500 represents a GUI page presenting a movie that a user can purchase and stream from a content server (e.g., content servers 102-103) of a content provider (e.g., Netflix or Hulu).

In this example, GUI 500 includes several information sections, such as, title 501, description 502, logo image 503, director 504, actors 505, and producer 506 of a movie. In addition, GUI 500 includes several buttons or controls that can be activated by a user to perform certain actions, such as, preview button 510 to preview the movie and buy button 511 to purchase the movie. These items or elements 501-506 and 510-511 are rendered based on the standard elements specified in the template-based application (e.g., JavaScript or XML file), which may be defined by a corresponding template (e.g., product template) provided by a device provider or content distributor. Elements 501-506 and 510-511 are rendered by content rendering framework 110 based on the corresponding template, including their shapes, colors, locations or layout of GUI 500. All a developer of a content provider needs to do is to fill in the information in proper tags or sections of the template. For example, a developer may just need to fill in the description of the title under the title tag and fill in the description under the description tag, etc., as well as other attributes (e.g., color, location). Based on this information, content rendering framework 110 can invoke its standard libraries to render items 501-506 and 510-511.

Figure 5B:
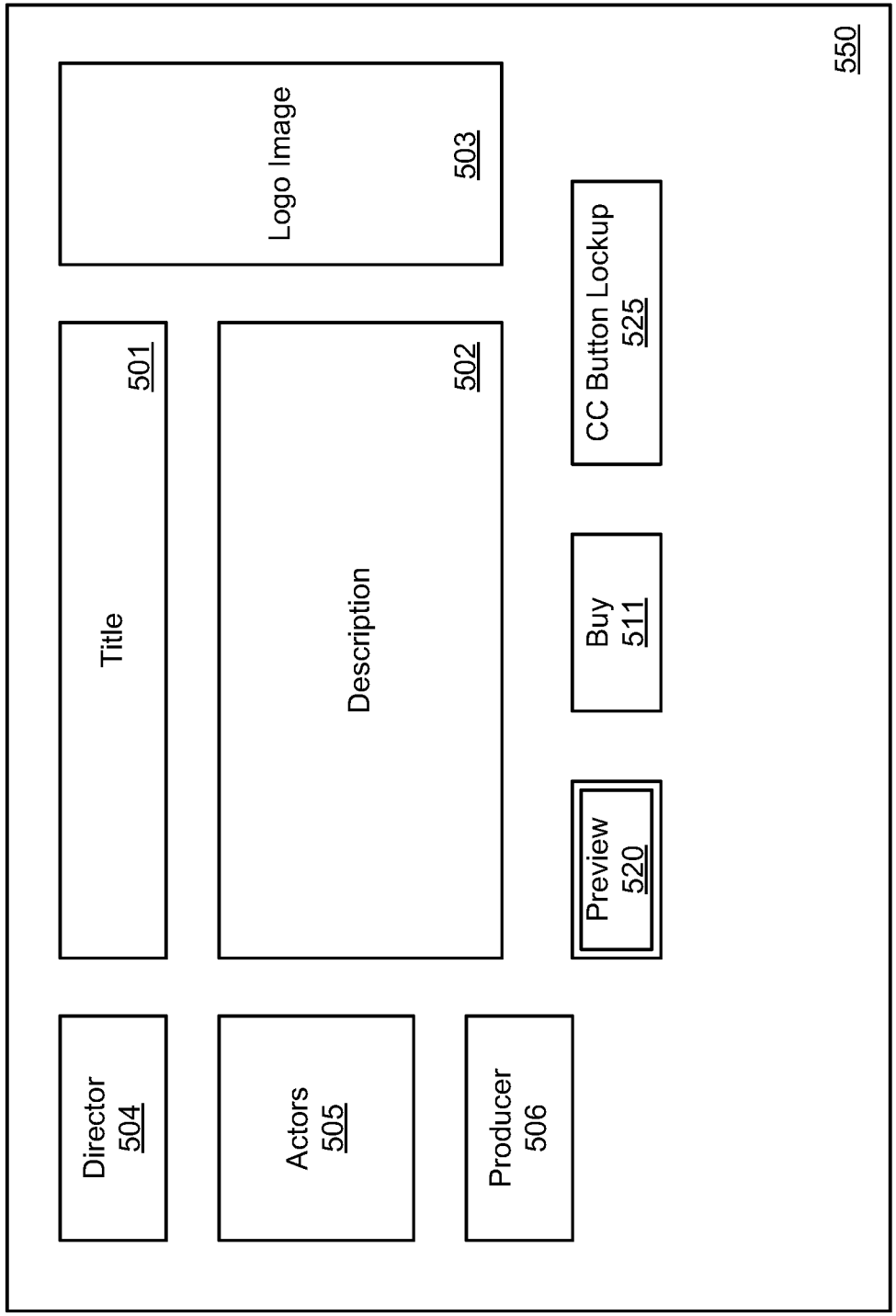

According to one embodiment, as described above, a developer of a content provider can also define a customized tag or section within the format requirement of the corresponding template to customize an existing item or element, and/or create a new item or element for its specific needs. FIG. 5B is a block diagram illustrating a GUI page that has been rendered with certain customized items or elements based on the customized tags in the template-based application according to one embodiment of the invention. Referring to FIG. 5B, in this example, similar GUI 500, GUI 550 includes items 501-506 and 511.

In addition, preview button 511 of FIG. 5A has been customized with a different appearance as shown as button 520 in FIG. 5B. The customized appearance of button 520 may be rendered by content rendering framework 110 based on one or more customized tags or sections specified in the corresponding template-based application. Furthermore, a new button 525 is also rendered based on a new and/or customized tag of the template-based application. According to a further embodiment, buttons 520 and 525 may be rendered by invoking a customized library via a customized API that may be invoked from client application 111 and/or the associated template-based application (e.g., JavaScript and/or XML) and bridged by content rendering framework 110.

FIG. 6 is pseudo code representing of a client application according to one embodiment of the invention. For example, the pseudo code as shown in FIG. 6 may represent a portion of client application 111 of FIG. 3. Client application 111 interacts or communicates with the corresponding template-based application (e.g., JavaScript 315 whose pseudo code is shown in FIG. 7 and/or the associated XML whose pseudo code is shown in FIG. 8) via content rendering framework 110. Referring to FIG. 6, a customized tag is registered at line 601, where the customized tag may be defined in the corresponding template-based application. In addition, a customized view is defined and registered at line 602. For example, the background color and a frame location and size are defined at line 602. In addition, a developer can use a software development kit (SDK), in this example, for developing a user interface, or other foundation classes provided by the device provider (e.g., Apple TV SDK) to render their custom content (e.g., custom button lockup type), similar to a manner of a native application.

Certain labels or texts may also be defined and registered for the customized view. These elements are registered with content rendering framework 110 and the corresponding runtime environment so that when pseudo code as shown in FIG. 6 is executed, content rendering framework 110 knows where to find the definition or declaration from the template-based application. In this example, the custom view creator block here receives a view element defined by the template-based application, such as, for example, under <ccButton-Lockup> tag. The custom code is free to parse its children attributes and styles to customize the appearance of the button. Furthermore, at line 603, the main application can call a function, in this example, logging function, defined by a customized library or native code (e.g., customized library or native code 112) via a customized API.

By defining the custom content via elements of a template-based application, a developer of a content provider does not have to change the main application (e.g., client application 111) often. All it needs is to change the attributes or parameters of the template-based application and makes it available for download from its content server. When the main application is launched, the template-based application is then downloaded and the new customized content can be rendered accordingly. That is, the main application may be maintained the same at the content distribution server (e.g., iTunes), while the new updates can be specified via a template-based application available for download from a content server of a content provider (e.g., Netflix or Hulu).

FIG. 7 is pseudo code illustrating an example of JavaScript according to one embodiment of the invention. For example, the JavaScript as shown in FIG. 7 can be downloaded from a content server (e.g., content servers 102-103) when the corresponding main application (e.g., client application 111) is launched. The main application is part of an application bundle (e.g., application bundle 120) that is downloaded from a content distribution server (e.g., server 104 such as iTunes). In this example, the JavaScript includes a URL that when the JavaScript is executed, it accesses the URL to download an XML file. The XML file may be downloaded from the same server from which the JavaScript is downloaded or from a different server dependent upon the specific configuration.

The XML file contains information describing how the content is to be rendered by a content rendering framework, which may be based on elements defined in a corresponding template as described above. The XML file is a way for the JavaScript to communicate with the content rendering framework what and how to render content to be presented to a user via a media player device. It is similar to how the HTML communicates with a browser with respect to what and how to render content to be presented to a user. In this example, the JavaScript is configured to show a product page to a user, where the XML file is constructed based on a product template. Note that at line 703, the JavaScript also calls a customized library that is downloaded as part of the corresponding application bundle, in this example, via a customized API "call_native_code_log_events." Once the XML file has been obtained and rendered into a DOM compatible document, it is pushed to the content rendering framework for presentation at line 704.

FIG. 8 is pseudo code presenting a template-based application according to one embodiment of the invention. In this embodiment, the pseudo code is part of an XML file that is downloaded, for example, via a JavaScript as shown in FIG. 7. Referring to FIG. 8, the XML file includes several standard elements defined by the corresponding template, including title 801, description 802, preview button and buy button 803, which represent at least some of the content as shown in FIGS. 5A-5B (e.g., title 501, description 502, preview button 510, and buy button 511). In addition, the XML file also includes a customized tag 804 that defines a customized button (e.g., button 525 of FIG. 5B). Based on the information specified in the standard tags and customized tags of the XML file, content rendering framework 110 can render both the standard content and customized content as described above.

Figure 9:
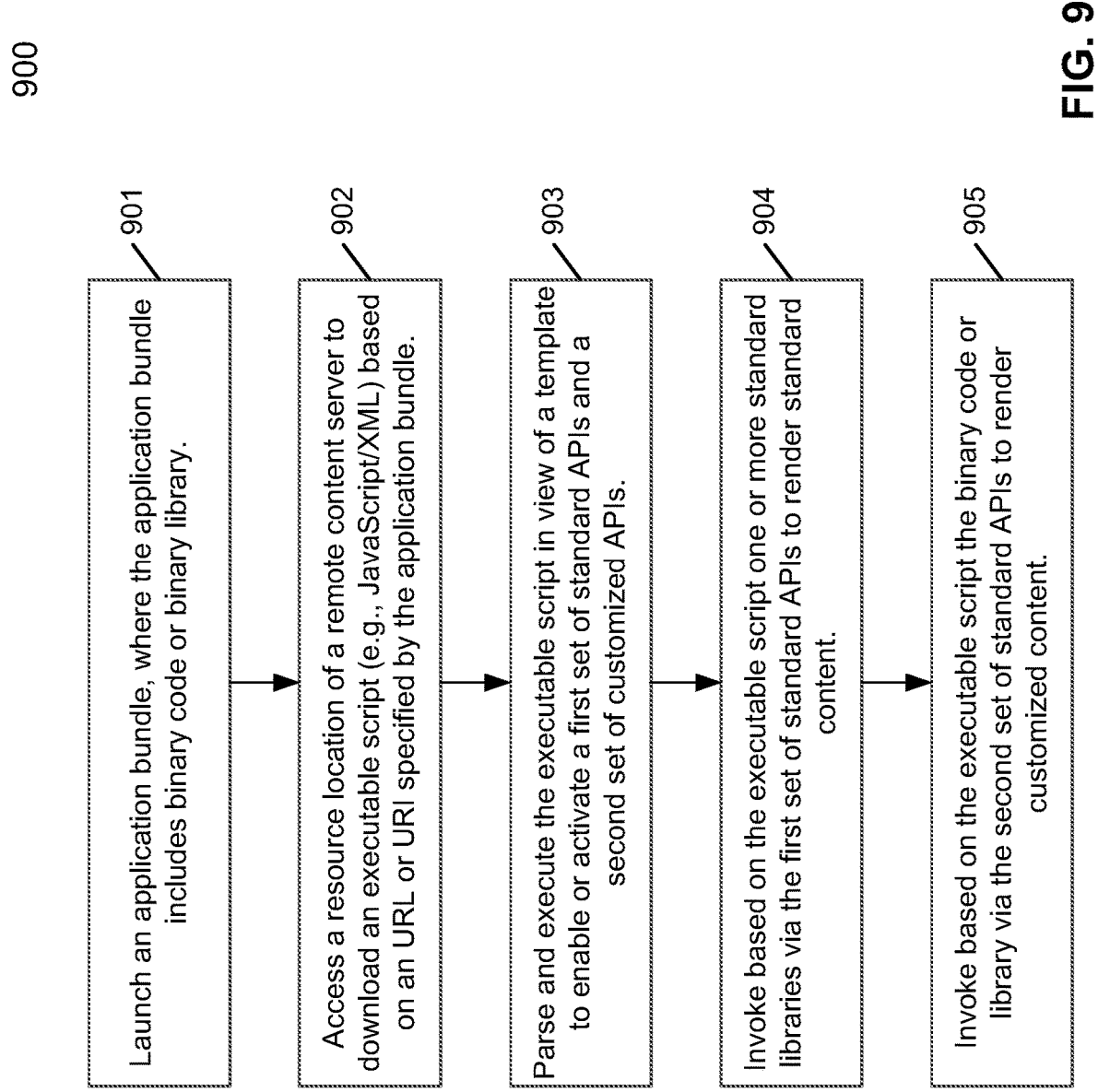
FIG. 9 is a flow diagram illustrating a process of rendering content at a media player device according to one embodiment of the invention.

FIG. 9 is a flow diagram illustrating a process of rendering content at a media player device according to one embodiment of the invention. Process 900 may be performed by processing logic that includes software, hardware, or a combination thereof. For example, process 900 may be performed by content rendering framework 110. Referring to FIG. 9, at block 901, processing launch an application bundle that includes a binary code or binary library. The binary code or library may be created using a native programming language (e.g., C/C++). At block 902, processing logic accesses a resource location of a remote content server to download an executable script such as JavaScript and/or associated XML based on a URL or URI specified within the application bundle. At block 903, processing logic parses and execute the executable script in view of a template to enable or activate a first set of APIs and a second set of APIs. At block 904, processing logic invokes based on the executable script one or more standard libraries via the first set of APIs to render standard content. At block 905, processing logic invokes based on the executable script the binary code or binary library to render customized content.

Figure 10:
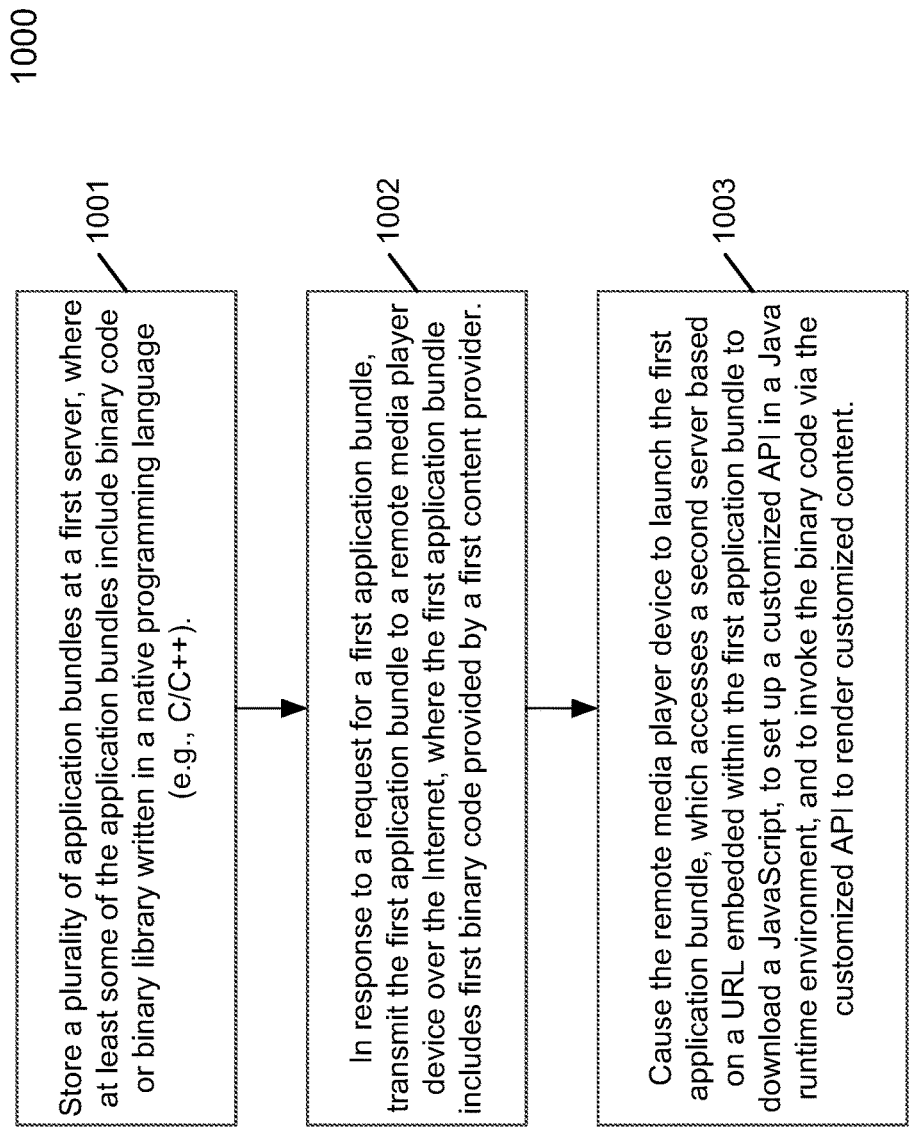
FIG. 10 is a flow diagram illustrating a process of distributing content according to one embodiment of the invention.

FIG. 10 is a flow diagram illustrating a process of distributing content according to one embodiment of the invention. Process 1000 may be performed by processing logic that includes software, hardware, or a combination thereof. For example, process 900 may be performed by server 104 of FIG. 1. Referring to FIG. 10, at block 1001, a first server stores application bundles, where at least some of the application bundles include binary code or a binary library that is written in a native programming language (e.g., C/C++). The application bundles are provided by a variety of content providers, such as, for example, Netflix, Hulu, etc. At block 1002, in response to a request for a first application bundle, processing logic transmits the first application bundle to a remote media player device (e.g., Apple TV set-top box) over the Internet. The first application bundle includes first binary code or binary library provided by a first content provider. At block 1003, when the first application bundle is executed at the remote media device, it causes the media player device to access a second server based on a URL embedded within the first application bundle to download an executable script such as JavaScript and/or XML (e.g., template-based application), to set up a customized API in a script runtime environment and to invoke the binary code/library via the customized API to render customized content.

Note that some or all of the components as shown and described above (e.g., content rendering framework 110 of FIGS. 1 and 3) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
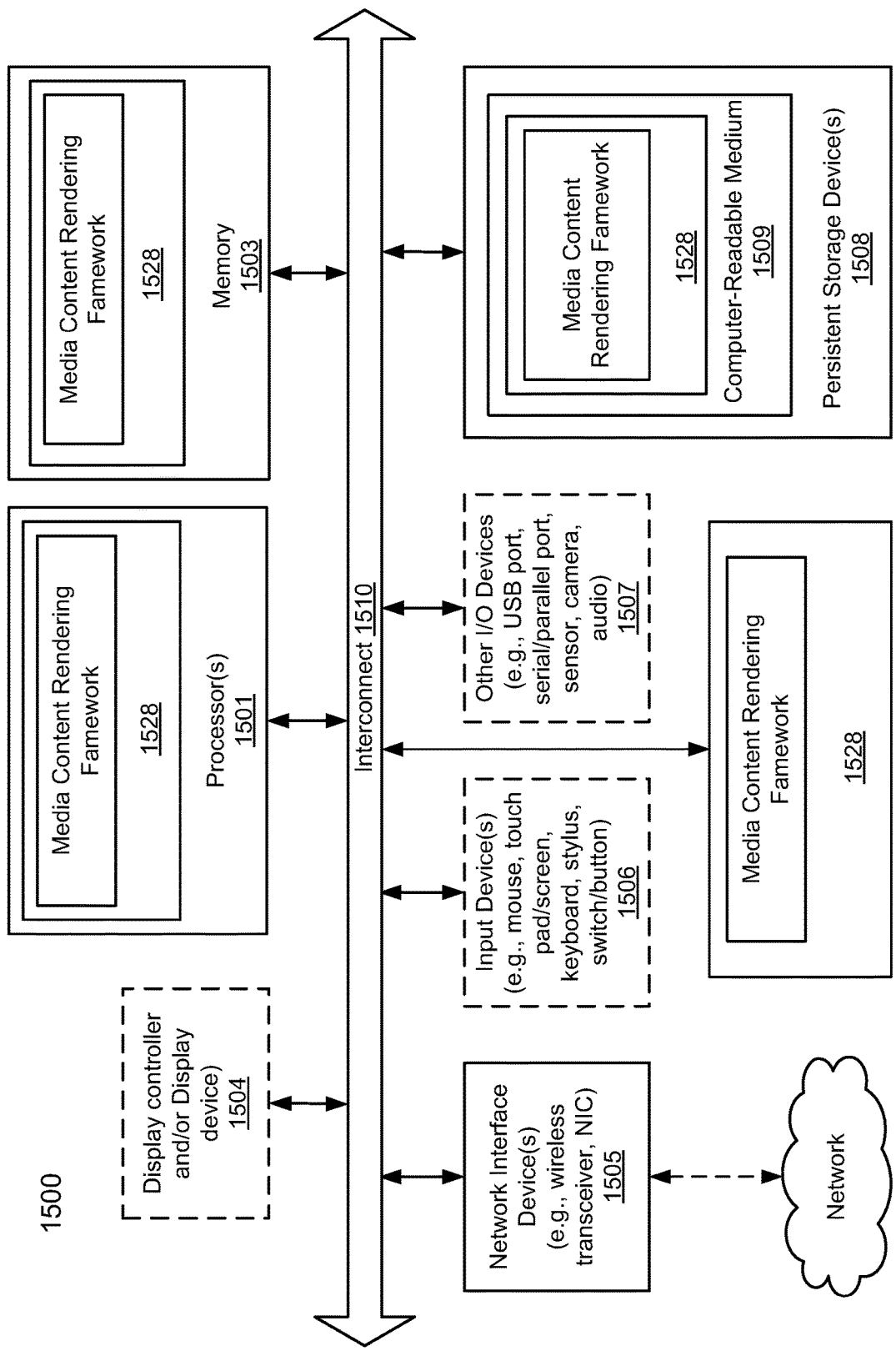
FIG. 11 is a block diagram illustrating a data processing system according to one embodiment.

FIG. 11 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, content rendering framework 110 of FIG. 1. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
launching, by an application launcher of a media player device, an application bundle, the application bundle including a binary code;
presenting a user interface that includes a first set of user interface elements and a second set of user interface elements, wherein the first set of user interface elements is associated with a predetermined library maintained by the media player device that is accessible via a first application programming interface (API) defined by a device provider of the media player device and the second set of user interface elements is associated with binary code that is accessible via a second API defined by a content provider that provides content for presentation by the media player device;
rendering, standard content by invoking the predetermined library via the first API; and
rendering, customized content by invoking the binary code via the second API.

2. The method as in claim 1 wherein the customized content is tailored to a requirement of the content provider.

3. The method as in claim 2 wherein the content provider provides an application that executes on the media player device, and wherein the application is downloaded to the media player device.

4. The method as in claim 1, wherein the standard content is rendered based on a set of standard tags.

5. The method as in claim 1, wherein the custom content is rendered based on a set of custom tags of a template-application of the application bundle.

6. The method as in claim 5, wherein a template-based application is provided by the content provider.

7. The method as in claim 5, wherein the template-based application is download in response to the launching of the application bundle.

8. A non-transitory machine-readable medium having instructions stored therein, which when executed by a processor, cause the processor to perform a method, the method comprising:
launching, by an application launcher of a media player device, an application bundle, the application bundle including a binary code;
presenting a user interface that includes a first set of user interface elements and a second set of user interface elements, wherein the first set of user interface elements is associated with a predetermined library maintained by the media player device that is accessible via a first application programming interface (API) defined by a device provider of the media player device and the second set of user interface elements is associated with binary code that is accessible via a second API defined by a content provider that provides content for presentation by the media player device;
rendering, standard content by invoking the predetermined library via the first API; and
rendering, customized content by invoking the binary code via the second API.

9. The non-transitory machine-readable medium of claim 8, wherein the customized content is tailored to a requirement of the content provider.

10. The non-transitory machine-readable medium of claim 8, wherein the content provider provides an application that executes on the media player device, and wherein the application is downloaded to the media player device.

11. The non-transitory machine-readable medium of claim 8, wherein the standard content is rendered based on a set of standard tags.

12. The non-transitory machine-readable medium of claim 8, wherein the custom content is rendered based on a set of custom tags of a template-application of the application bundle.

13. The non-transitory machine-readable medium of claim 12, wherein a template-based application is provided by the content provider.

14. The non-transitory machine-readable medium of claim 12, wherein the template-based application is download in response to the launching of the application bundle.

15. A media player device, comprising:
a processor; and
a memory storing instructions, which when executed by the processor, cause the processor to
launch, by an application launcher of a media player device, an application bundle, the application bundle including a binary code;
present a user interface that includes a first set of user interface elements and a second set of user interface elements, wherein the first set of user interface elements is associated with a predetermined library maintained by the media player device that is accessible via a first application programming interface (API) defined by a device provider of the media player device and the second set of user interface elements is associated with binary code that is accessible via a second API defined by a content provider that provides content for presentation by the media player device;
render, standard content by invoking the predetermined library via the first API; and
render, customized content by invoking the binary code via the second API.

16. The media player device of claim 15, wherein the customized content is tailored to a requirement of the content provider.

17. The media player device of claim 15, wherein the content provider provides an application that executes on the media player device, and wherein the application is downloaded to the media player device.

18. The media player device of claim 15, wherein the standard content is rendered based on a set of standard tags.

19. The media player device of claim 15, wherein the custom content is rendered based on a set of custom tags of a template-application of the application bundle.

20. The media player device of claim 15, wherein a template-based application is provided by the content provider.

* * * * *